INVENTORS.
LOUIS D. MARTIN
KARL H. ROEHRS
BY
ATTORNEYS

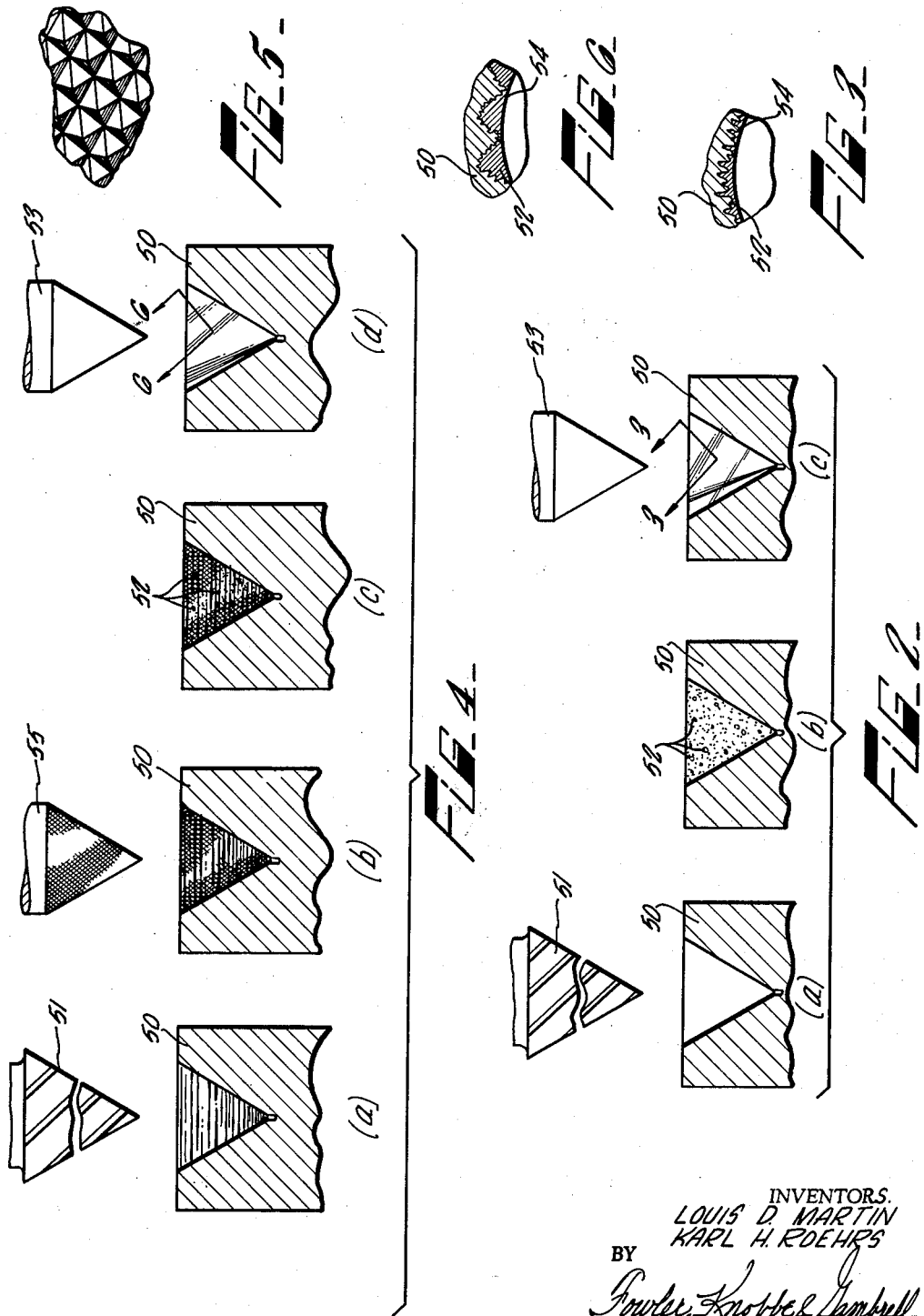

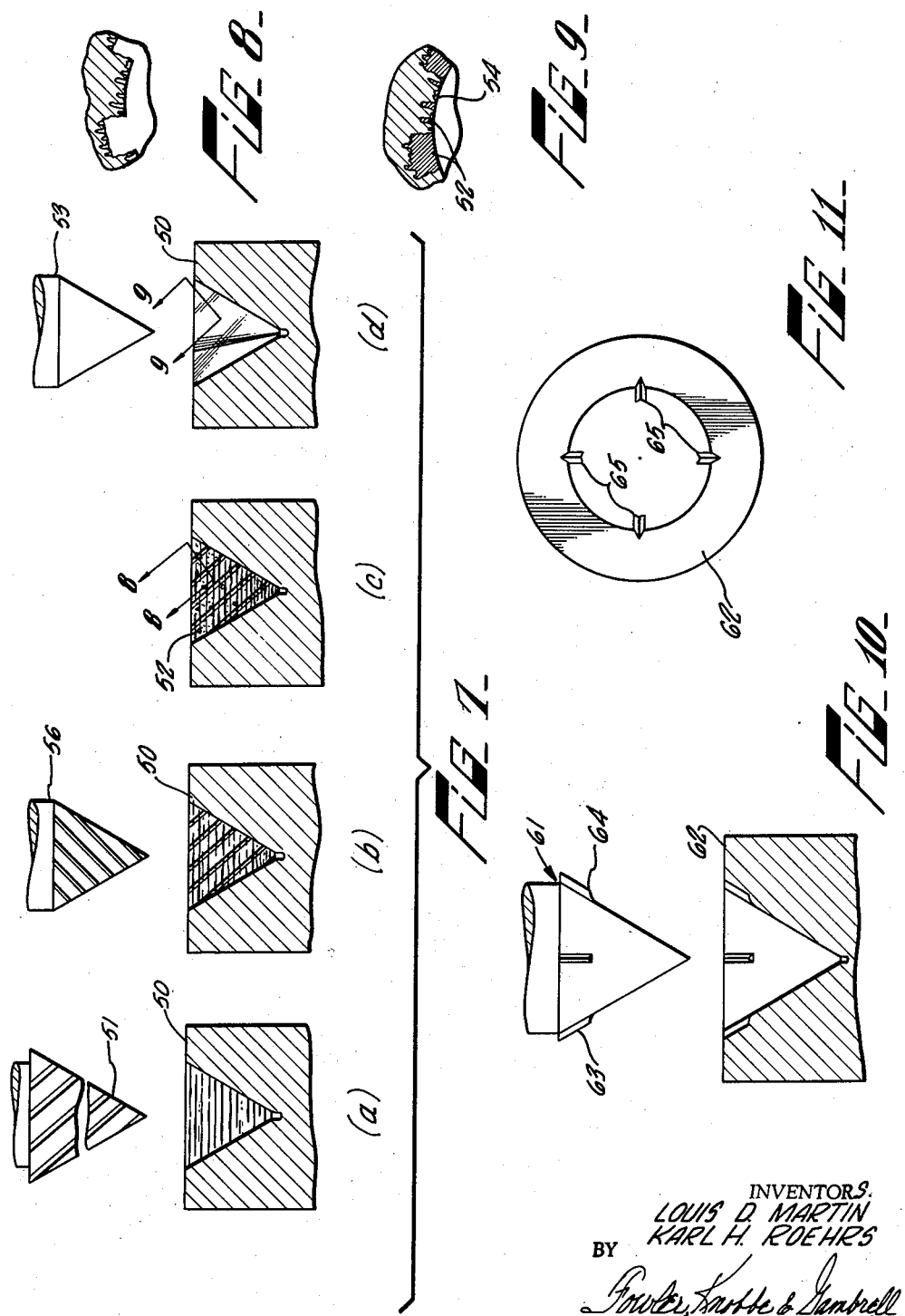

United States Patent Office 3,195,221
Patented July 20, 1965

3,195,221
PROCESS FOR FABRICATING SELF-LUBRICAT-
ING PRECISION SUPPORT CENTERS
Louis D. Martin, 1536 W. Woodcrest Ave., Fullerton,
Calif., and Karl H. Roehrs, 3564 Starline Drive, Rolling
Hills, Calif.
Filed Dec. 30, 1963, Ser. No. 334,359
6 Claims. (Cl. 29—149.5)

This invention relates broadly to a process for producing one or more accurately dimensioned surfaces, projections or cavities in machine elements or work pieces and more particularly, to a process for producing self-lubricated surfaces, projections or cavities for further machining operations of the machine elements or work pieces.

In the co-pending application, Serial No. 334,360, filed on an even date herewith, one of the present inventors discloses and claims apparatus and a process for producing precision support centers for work pieces. The key is to simultaneously form the coaxial centers by rapidly striking the surfaces with peening hammers so as to produce, for sophisticated uses, precision centers constituting substantially mirror images of the peening hammer faces.

The present invention constitutes an improvement over that disclosed and claimed in the above-identified application and, more particularly, relates to a process for producing precision surfaces, projections and cavities that are self-lubricating. In its exemplary form the present invention not only provides self-lubricating support centers, but centers that have surfaces more uniform than those of supports that are not self-lubricating, inasmuch as the lubricating materials fill the interstices or matrix of the support surfaces so that the area of contact between a journal and the bearing surface of the centers, for example, is materially increased.

In many uses of centers of the type and quality described in the above-identified co-pending application, there is no necessity for providing a self-lubricating feature, but when the work piece is to be worked on a great deal or the load and speed imposed thereon during finishing is going to be substantial, it is necessary to provide some effective means to lubricate the support centers as they rotate on one or more parts of the grinding machines or similar supporting machine. Not only is such lubrication necessary to prevent the metal parts from seizing, it is also necessary to reduce the heat build-up which might damage the work piece, the supporting tool or both.

The use of dry or paste lubricants, such as molybdenum disulfide, colloidal or granulated graphite and similar materials in lubricated bearings is well known. In the usual case, however, it is necessary to provide some adhesive to bond such lubricants to the journal or bearing surface itself. In the present invention, it has been found possible by peening the lubricant and the surface simultaneously to provide a substantially self-lubricating bearing without the use of binders, adhesives or other additional materials. The lubricant itself is interstitially trapped in the asperant surfaces and held there by the matrix of the metal of the work pieces.

The present invention constitutes a process for producing a precision self-lubricating surface, cavity or projection in a work piece or machine element comprising the steps of forming a projection or aperture of a pre-selected configuration on or in a work piece, applying a quantity of powder or paste lubricant to the asperant surface, and peening the asperant surfaces of the projection or cavity with a tap that is a mirror image of the configuration desired.

Specifically, the present invention envisages a process for producing highly uniform and curvilinear coaxial centers in work pieces comprising the steps of forming apertures of pre-selected configurations in opposite parts of a work piece along a common axis, applying a quantity of lubricant to the asperant materials defining the coaxial apertures, and simultaneously peening the surfaces defining the aperture with coaxial means to lock the lubricant in the interstices thereof whereby the centers have a uniform finish and are essentially self-lubricating.

In one exemplary embodiment of the present invention, the process involves drilling or otherwise forming the coaxial apertures in the ends of a work piece, applying a quantity of lubricant to the surfaces thereof and peening the lubricant and surface simultaneously to provide the finished center supports.

In another exemplary embodiment of the invention, the coaxial support centers are drilled or otherwise formed, one or more peening hammers of pre-selected surface configurations, such as knurled peening hammers, are used to form a matrix which is a mirror image of the knurled hammer faces, a quantity of dry or paste lubricant is applied to the knurled support center surfaces, and the centers are thereafter peened with a pair of uniformly surfaced or polished, conically-shaped peening hammers to provide smooth, self-lubricating support centers wherein the lubricant is retained within the matrix of the work-piece material itself.

Yet another embodiment of the present invention—one particularly useful in those cases where a substantial amount of lubricant is required—utilizes peening hammers having helically oriented ridges or shoulders to "score" the support center surfaces before the lubricant is applied thereto. Thereafter highly polished, conically-shaped hammers are employed to force the lubricant into the grooves formed by the helical shoulders as well as into the interstices. The resulting support centers have a series of helically oriented strips of lubricant intermediate parts of the work piece in addition to that which smooths out the asperities in the surfaces.

And yet another modification of the various processes described and the products formed by them employs a peening hammer having a series of radial projections or shoulders at the base of at least one of the peening tools to form driving grooves in the support center surfaces at the same time that the support center surface itself is peened to produce the precision centers.

Looking to the product formed by one or more of the various processes, most broadly, it is a machine element having at least one precision formed cavity, projection or surface formed by peening a lubricant against the asperant surface of the cavity whereby the lubricant is locked in a matrix of the work piece material. This forms a surface which is substantially free of asperities and which is substantially self-lubricating.

These and other advantages and features of the present invention may be more fully understood when the following detailed description is read in respect to the drawings in which:

FIG. 2 is a first exemplary process in accordance with the present invention;

FIG. 3 is an enlarged profile taken along line 3—3 of FIG. 2c of the finished surface defining the support center formed by the first exemplary process;

FIG. 4 is a second exemplary process in accordance with the present invention;

FIG. 5 is an enlarged partial perspective of the surface defining the support center at an intermediary stage of the second exemplary process as illustrated in FIG. 4b;

FIG. 6 is an enlarged profile taken along line 6—6 of FIG. 4d of the finished surface defining the support center formed by the second exemplary process;

FIG. 7 is a third exemplary process in accordance with the present invention;

FIG. 8 is an enlarged profile taken along line 8—8 of FIG. 7b of the surface defining the support center at an intermediary stage of the third exemplary process;

FIG. 9 is an enlarged profile taken along line 9—9 of FIG. 7d of the finished surface defining the support center formed by the third exemplary process;

FIG. 10 is a schematic representation of means for providing driving grooves in one or more of the finished center supports; and, FIG. 11 is plan view taken the lines 11—11 of FIG. 10 of a finished center support with driving grooves formed therein.

Figure 1:
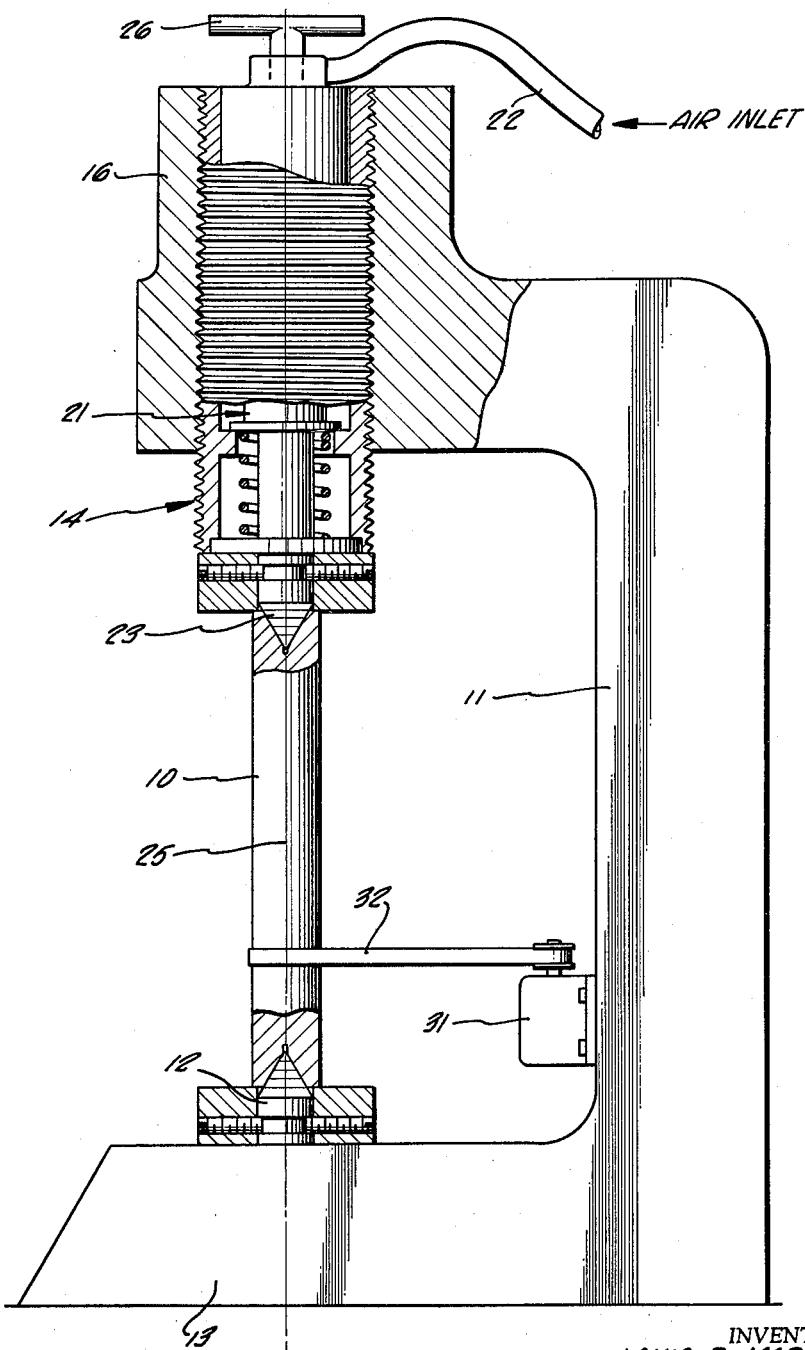
FIG. 1 is exemplary apparatus capable of carrying out the inventive process and form the precision centered work pieces.

Exemplary apparatus capable of performing the various processes disclosed and claimed herein is illustrated in FIG. 1. It consists of a generally C-shaped member 11 having a fixed center support and hammer 12 at its lower end 13 and a vertically adjustable peening hammer 14 threadedly supported in the upper end 16 of the frame member 11.

The peening assembly 14 includes an air hammer mechanism 21 supplied with air (from a means not shown) by air tube 22 and a movable center support and peening hammer 23 attached thereto. A handle 26 is provided for rotating the peening hammer assembly 14 along the longitudinal axis 25 of the frame member and exemplary work piece 10.

In operation, the assembly 14 is moved upwardly with respect to the top of FIG. 1 and an exemplary work piece 10, which has been pre-drilled—with a drill having a base angle of 55° to 58° preferably—is placed therein. The assembly 14 is rotated downwardly whereby the peening hammers 12 and 23 engage the conical apertures in the work pieces to support it. Upon operation of the air hammer 21, the surfaces of the work piece 10 are subjected to a series of rapid impacts to provide the finished surfaces.

A motor 31 is operable to rotate a fabric belt 32, which is disposed around the work piece 10. This provides means for slowly rotating the work piece 10 as the center supports are surfaced by the peening hammers 12 and 23.

In accordance with the teaching of the present invention, of course, after the work piece 10 is pre-drilled along a common plane and before the work piece is placed between the center supports for the peening operation, a paste or dry lubricant is applied to the rough surfaces. In other embodiments, which will be explained in more detail below, variations of the steps of using the exemplary apparatus of FIG. 1 are required. For more details on the apparatus disclosed in FIG. 1 and other types, reference should be had to the co-pending application identified above. Since the apparatus, per se, forms no part of the present invention, it is not described in detail.

It should be understood in connection with the following discussion of processes for producing the self lubricating precision centers desired that the step illustrations show only one end of a work piece although the steps would, in most cases, be performed simultaneously on both ends, as the apparatus makes possible. It should also be understood that female peening hammers could be used instead of male ones to practice the present invention, as discussed in more detail in the above referred-to application.

Looking to the first exemplary embodiment of the instant invention illustrated in FIGS. 2 and 3, the work piece is designated as 50; the drill tip as 51; the powder or paste lubricant as 52; and the peening hammer as 53. The process can be observed to comprise the steps of (1) drilling or otherwise of forming an aperture in one end of a work piece [exemplarily illustrated as a right circular cone in FIG. 2a], (2) applying a quantity of lubricant, either powder or paste, to the asperant surfaces of the center supports [depicted in FIG. 2b], and (3) subjecting the surfaces of the center support to the impact of a peening hammer formed as a mirror image of the surface desired for the center support to fill the interstices with lubricant [illustrated in FIG. 3c].

FIG. 3 is an enlarged profile of the surface taken along line 3—3 of FIG. 2c and illustrates the way in which the lubricant 52 smooths out the asperant surface of the work piece 50 to provide a substantially uniform curvilinear surface designated as 54, for the finished center support. Because of the random scoring of the center support surfaces by the action of the drill 51, the impact of the hammer forces the dry lubricant 52 into the valleys of the surface. The result is a surface in which the lubricant is held without any additional adhesive or bonding material being needed. Not only does the pressure of the hammers compress the lubricant in the interstitial parts of the surface of the work piece 50, but as the high spots on the rough surface are deformed by the peening hammer, they act to lock the lubricant in the valley portions of the finished surface 54.

Turning to the variation of the basic process which is the second embodiment of the present invention and is specifically illustrated in FIGS. 4–6, the purpose is to provide a roughened surface of a pre-selected cross section to thereby assure that the lubricant is dispersed relatively uniformly throughout the surface of the finished center support. In this embodiment, the work piece is again identified as 50, the drill tip as 51, the finish peening hammer as 53, the lubricant as 52, and an intermediate knurled peening hammer as 55.

The process involves broadly 4 steps: (1) drilling the ends of the work piece along a common axis by drill tip 51, (2) peening the conically shaped aperture in the work piece 50 with a peening hammer such as 55 that has a pre-selected pattern of irregularities formed in its surface, (3) applying a quantity of lubricant 52 to the mirror image aperture generated by peening the center with a hammer such as 55, the thereafter (4) peening the surfaces of the aperture with a smooth right circular cone-shaped hammer such as 53 to provide a smooth and highly polished center support which is uniformly self-lubricating.

FIG. 5 is an enlarged profile taken along 5—5 of FIG. 4b and illustrates the effect of using a knurled peening tool such as 55 to provide the matrix for lubricant 52. FIG. 6, which is an enlarged profile along 6—6 of FIG. 4d, illustrates the way in which the lubricant 52 fills the interstices or valleys of the work piece 50 between the apexes formed by the knurling tool 55 to provide a substantially uniform and transversely curvilinear surface 54 for the center support bearing. Again, as in the case of the process illustrated in FIG. 2, the final step is to peen the surfaces with a smooth finish hammer 53. It causes the apexes to be deformed to some extent and their edges act as lips to hold the lubricant 52 in the interstitial parts of the surface 54.

Turning to the third exemplary process, there is disclosed basically a four-step process wherein an intermediate peening hammer having a series of parallel, helically disposed shoulders formed on it is used to score the pre-drilled support center to provide substantial depressions in the work piece surface for lubricant. The purpose of this particular variation of the basic process is designed to provide a center support which can withstand substantially heavy loads and which in use must be capable of providing a substantial degree of lubrication. In these series of process steps, the work piece is identified as 50; the drill tip as 51; the lubricant as 52; the finishing peening hammer as 53; and the intermediate hammer as 56.

The process for producing self-lubricated coaxial center supports in work pieces in accordance with this variant comprises the steps of (1) drilling or otherwise forming a center support in at least one end of a work piece such as 50, (2) scoring the surfaces defining the center support with a peening hammer having a series of helically oriented, rectangular shoulders on it to provide a series of parallel, helically oriented grooves or indentations in the surface of the center support, (3) applying a quantity of lubricant to the surfaces of the center support and specifically in the grooves formed therein, and (4) peening the center support surfaces with smooth, highly polished peening hammers to form precision center supports having uniform, curvilinear surfaces.

FIG. 8 is an enlarged profile taken along line 8—8 of FIG. 7b to illustrate how the surface of the work piece center support is scored with the parallel helically oriented grooves of intermediate peening tool 56, and FIG. 9 is an enlarged profile taken along lines 9—9 of FIG. 7d to illustrate the way in which the grooves and valleys in the asperant surface are filled with dry lubricant 52 to provide a substantially uniform, curvilinear center support surface 54.

For all of these modifications of the basic concept herein disclosed, a series of driving grooves could be provided if the work piece is to be self-driven rather than secured to the front face of an engine lathe, as, for example by a conventional dog.

FIGS. 10 and 11 illustrate a means by which one or more driving grooves could be formed in a center support simultaneously with the finishing operation itself. A peening hammer 61 is illustrated in FIG. 10 cooperating with the aperture defined by the surfaces of a work piece 62. The peening hammer 61 is illustrated as a right circular cone having approximately a 60° included angle and having four projecting shoulders 63 extending from the base of the cone part-way down the sides of the cone that terminate at the apex of the cone. The cross section configuration of the shoulders 63 and their length can be varied from that shown in FIG. 10 although the use of angular edges, such as 64 in the exemplary embodiment of FIG. 10 is to be preferred. The shoulders 63 are formed 90° apart around the periphery of the base of the peening tool 63 to provide four spaced-apart grooves 65 in the center support surface (FIG. 11).

To some extent the peening tool 61 would not provide a smooth surface as highly polished as those provided by the cone-shaped hammers of the three illustrative embodiments of the present invention, but it must be remembered that if driving grooves are to be formed in one end of the work piece, then that end is not usually going to be rotated but will be held fixed at all times with respect to the line center of the grinder or other device upon which the work piece is being machined. What is important is that the driving grooves hold the work piece along a common axis with the rotating center support of the work piece. The result will be a highly satisfactory center configuration such that any substantial machining of the work pieces can be done rapidly and with extreme precision.

On the other hand, if it is desirable that the peening hammer 61 finish the ungrooved part of the center support surface to fairly rigid standards, inasmuch as that center support may not be driven in every case but may be the rotating center support in a subsequent operation, then greater care must be taken to provide the critical bearing surface in spite of the grooves.

While this invention has been described with respect to a few variations of the basic process, it should be obvious to those skilled in the art that various other means and techniques may be envisaged by which the basic concept may be utilized to good advantage. It is for this reason that the invention should only be limited to the extent of the claims.

We claim:
1. A process for producing self-lubricating support centers for work pieces and the like comprising the steps of
   drilling conically-shaped apertures in opposite ends of a work piece along a common axis,
   shaping the conical aperture by peening the surface thereof with a tool having a face of patterned irregularities,
   applying a quantity of film lubricant to the asperant materials defining the apertures, and
   simultaneously peening the surfaces defining the apertures with highly uniform, conically-shaped tools to force the lubricant into the interstices of the surface so that support centers are formed that are mirror images of the conically-shaped hammers.
2. A process for producing self-lubricating support centers for work pieces in accordance with claim 1 wherein the conical aperture is shaped by a peening hammer having a knurled surface thereon.
3. A process for producing self-lubricating support centers for work pieces in accordance with claim 1 wherein the conical aperture is shaped by a peening hammer having a series of parallel shoulders thereon.
4. A process for producing self-lubricating, coaxially aligned precision bearing surfaces for work pieces comprising the steps of
   forming coaxial bearing surfaces having preselected roughened configurations at opposite parts of a work piece,
   applying a quantity of lubricant to the roughened bearing surfaces, and
   simultaneously peening the bearing surfaces with highly uniform tools to lock the lubricant in the interstices of the bearing surfaces so that support centers are formed that are mirror images of the peening tools.
5. A process for producing self-lubricating, coaxially aligned precision bearing surfaces for work pieces in accordance wtih claim 4 wherein the bearing surfaces of preseleected configurations that are formed are obtained by the steps of drilling or routing apertures of the generally preselected configuration and peening patterns of depressions in the excised surfaces thereof so that a substantial amount of lubricant can be interstitially locked in the surfaces defining the apertures.
6. A process for producing self-lubricating bearing centers for work pieces in accordance with claim 5 wherein the pattern of depressions is a series of helically oriented, parallel grooves.

References Cited by the Examiner
UNITED STATES PATENTS

| | | | |
|---|---|---|---|
| 1,444,628 | 2/23 | Miller | 29—149.5 |
| 1,669,116 | 5/28 | Barber | 78—13 |
| 1,964,671 | 6/34 | Nesbit | 29—149.5 |
| 2,187,626 | 1/40 | Merriman | 308—239 |
| 2,373,871 | 4/45 | Connor et al. | 29—149.5 |
| 2,518,086 | 8/50 | Snorek | 78—6 |
| 2,535,588 | 12/50 | Mead | 83—441 |
| 2,674,782 | 4/54 | Surtees | 29—149.5 |
| 2,808,885 | 10/57 | Tomka | 78—42 |
| 3,036,367 | 5/62 | Ricks | 29—424 |
| 3,062,599 | 11/62 | Campbell | 308—239 |

FOREIGN PATENTS 630,019  10/49  Great Britain.

WHITMORE A. WILTZ, *Primary Examiner.*

THOMAS H. EAGER, *Examiner.*